(12) United States Patent
Mohr et al.

(10) Patent No.: US 6,363,719 B2
(45) Date of Patent: Apr. 2, 2002

(54) HYDRAULIC CONTROL UNIT FOR A MOTOR VEHICLE BRAKING SYSTEM

(75) Inventors: Kurt Mohr, Halsenbach; Salvatore Oliveri, Filsen; Thomas Wagner, Vallendar, all of (DE)

(73) Assignee: Lucas Industries Public Limited Company (GB)

( * ) Notice: Subject to any disclaimer, the term of this patent is extended or adjusted under 35 U.S.C. 154(b) by 0 days.

(21) Appl. No.: 09/749,209

(22) Filed: Dec. 27, 2000

Related U.S. Application Data

(63) Continuation of application No. PCT/EP99/05249, filed on Jul. 22, 1999.

(30) Foreign Application Priority Data

Jul. 24, 1998 (DE) .......................................... 198 33 410

(51) Int. Cl.[7] .............................................. F16D 31/02
(52) U.S. Cl. .............................. 60/414; 60/416; 138/31
(58) Field of Search .......................... 60/413, 414, 415, 60/416; 138/30, 31; 92/43

(56) References Cited

U.S. PATENT DOCUMENTS

| 4,858,898 A | 8/1989 | Niikura et al. .............. 267/218 |
| 5,360,322 A | 11/1994 | Henein et al. .............. 417/313 |
| 5,403,077 A | 4/1995 | Burgdorf et al. ......... 303/115.4 |
| 5,771,936 A | * 6/1998 | Sasaki et al. ................. 138/31 |

FOREIGN PATENT DOCUMENTS

| DE | 31 33 111 A1 | 4/1983 |
| DE | 39 00 899 A | 7/1989 |
| DE | 40 23 706 A1 | 1/1992 |
| DE | 41 07 625 A1 | 9/1992 |
| DE | 41 20 665 A1 | 12/1992 |
| DE | 43 01 287 A1 | 7/1994 |
| DE | 43 43 386 A1 | 6/1995 |
| DE | 196 16 538 A1 | 11/1997 |
| DE | 196 21 786 A1 | 12/1997 |
| JP | 09086362 A | 3/1997 |
| JP | 09086362 A | * 3/1997 |

OTHER PUBLICATIONS

Leichner, K. H.: "Fahrzeuggerechte Speichersysteme und ihre Einsatzbedingungen", in O+P Ölhydraulik und Pneumatik, vol. 36, 1992, No. 8, pp. 498–501.

* cited by examiner

*Primary Examiner*—Edward K. Look
*Assistant Examiner*—Thomas E. Lazo
(74) *Attorney, Agent, or Firm*—MacMillan, Sobanski & Todd, LLC

(57) ABSTRACT

A hydraulic control unit for a motor-vehicle braking system includes a pump (32) delivering hydraulic fluid under pressure, the pump being capable of being controlled by an electronic control unit (ECU) and supplying the hydraulic fluid for at least one braking device (22) which is coupled to a wheel of the vehicle, and also a first reservoir (34) for pressureless hydraulic fluid, which is assigned to the pump (32) on the input side, and a second reservoir (36) for hydraulic fluid under pressure, which is assigned to the pump (32) on the output side. In order to design the control unit for good packaging and installation space considerations, the pump (32), the first reservoir (34), and the second reservoir (36) are arranged in a common casing (60), and integrated as an electrohydraulic modular unit.

21 Claims, 5 Drawing Sheets

HYDRAULIC CONTROL UNIT FOR A MOTOR VEHICLE BRAKING SYSTEM

CROSS-REFERENCE TO RELATED APPLICATIONS

This application is a continuation of co-pending international application PCT/EP99/05249, filed Jul. 22, 1999, which claimed priority to German patent application number 198 33 410.9, filed Jul. 24, 1998.

The present invention relates to a hydraulic control unit for a motor-vehicle braking system, in particular for a motor-vehicle braking system with a pump delivering a hydraulic fluid under pressure, said pump being capable of being controlled by an electronic control unit and supplying the hydraulic fluid for at least one braking device which is coupled to a wheel of the vehicle, and with a first reservoir for pressureless hydraulic fluid, which is assigned to the pump on the input side.

In the state of the art, pressure accumulators by way of developments of a second reservoir are known which are designed as gas-piston accumulators, as gas-diaphragm accumulators or as multilayer gas-diaphragm accumulators, or as spring-piston accumulators. In this connection the physical size of the respective pressure accumulators varies considerably for the same useful volume. Furthermore, for pressure accumulators with gas filling there are problems with respect to the temperature dependence and the imperviousness in long-term behaviour. Further disadvantages in the case of multilayer gas-diaphragm accumulators are the considerable weight and the high costs. In the case of spring-piston accumulators there is the problem of wear and tear of the seal between the cylinder and the moving piston. All these problems limit the operating life of the pressure accumulators.

In the case of the electrohydraulic braking systems that are known in the state of the art, use is made of standard commercial gas accumulators or diaphragm accumulators which are screwed to an outer side of the hydraulic unit. As a result, the hydraulic unit becomes unshapely, so that problems as regards installation space arise in not uncritical manner.

A control device for brake fluid with a pump delivering hydraulic fluid under pressure is known from JP-09086362 A. The pump is capable of being driven by a motor, and a first reservoir for pressureless hydraulic fluid is assigned to said pump on the input side. A second reservoir for hydraulic fluid under pressure is assigned to the pump on the output side. In a drawing pertaining to JP-09086362 A the pump and the first and second reservoirs and, in particular, also the motor are combined so as to form an operating block. There is no indication in JP-09086362 A that the aforementioned operating block is to be equated to a casing. In known motor-vehicle braking systems the motor driving the pump has its own motor casing which, for the most part, is produced from synthetic material. This motor casing is attached to a pump casing which, as a rule, is manufactured from a metal alloy. Since the motor and the pump already have two individual casings, for a person skilled in the art of motor-vehicle braking technology it is eccentric to equate the operating block to a casing.

From the printed publication by Leichner, K. H.: "Fahrzeuggerechte Speichersysteme und ihre Einsatzbedingungen", in O+P Ölhydraulik und Pneumatik, Vol. 36, 1992, No. 8, pp 498–501, a metal-bellows accumulator subject to gas preloading is described that is less capable of being employed in the motor-vehicle industry. In this printed publication, the practical implementation of such metal-bellows accumulator is assessed quite severely in comparison with diaphragm accumulators as they exist at the present time.

From U.S. Pat. No. 4,858,898 a pressure accumulator for a vehicle is known which is provided, in particular, as a spring device. With this pressure accumulator, hydraulic fluid is conveyed to a spring-loaded bellows made of metal which encloses a gas chamber. In the process the gas enclosed within the gas chamber is compressed and constitutes a counterforce for the hydraulic fluid.

The object underlying the invention is to develop further the hydraulic control unit mentioned in the introduction in such a way that these disadvantages are avoided.

In order to achieve this object, the pump, the first reservoir and the second reservoir are arranged in a common casing.

In this way, on the one hand a considerable saving of weight is obtained, since a separate outer wall of the pressure accumulator becomes unnecessary. On the other hand, the integration of two functions (storage of potential energy and enclosure of the fluid) in one structural part enables a considerable simplification of the overall arrangement. Furthermore, moving seals, which can wear out by reason of friction, are avoided. Since conduction paths are dispensed with or are considerably shortened, a reduction in weight and a reduction of installation effort are also achieved.

By virtue of the integration of the first reservoir and the associated omission of the return and suction line, there is the advantage furthermore that the induction path leading to the pump can be designed not only to be considerably shorter but also, above all, to have a considerably larger induction cross-section, resulting in an improved suction behaviour of the pump, particularly at low temperatures, which contributes to enhancing the performance of the electrohydraulic braking system.

The second reservoir is preferably a hydraulic pressure accumulator, into which the hydraulic fluid is capable of being conveyed by the pump contrary to the force of a spring arrangement, whereby at least a first part of the spring arrangement is formed by a corrugated bellows, preferably made of metal.

Astonishingly, by virtue of the configuration according to the invention it is possible to obtain a space requirement that is barely greater than or even less than the space requirement of a traditional gas-pressure accumulator.

Nevertheless, the pressure accumulator according to the invention is not temperature-dependent or is barely temperature-dependent and, by reason of the absence of moving seals, has no wear problems.

According to the invention, one wall of the hydraulic pressure accumulator is formed at least partially by a recess in the casing. In this connection a considerable amount of material and weight is eliminated in comparison with the state of the art.

In this case the corrugated bellows is connected at a first end to a cover, which seals the recess in the casing, and is connected at a second end to a base.

Hence the corrugated bellows divides the recess in the casing into two regions, of which a first (inner or outer) region can be filled with gas and a second (outer or inner) region forms the second reservoir for hydraulic fluid under pressure. The included gas assists the spring action of the spring arrangement.

An advantageous further development provides that the corrugated bellows divides the recess in the casing into two regions, of which a first (inner or outer) region forms the first reservoir for pressureless hydraulic fluid and a second (outer or inner) region forms the second reservoir for hydraulic fluid under pressure. This measure achieves an especially high utilisation of space.

In a preferred embodiment of the invention a first aperture extending into the first region is provided which connects said first region to an overflow vessel.

In addition, a second aperture extending into the first region is arranged in the cover, which connects said first region to the input side of the pump.

Finally, a third aperture extending into the second region is arranged in the wall of the recess, which connects said second region to the output side of the pump.

A controllable valve arrangement is preferably arranged between the third aperture extending into the second region and the output side of the pump. Furthermore, yet other valve arrangements may also be integrated into the control unit.

In addition, a hydraulic-fluid line is arranged between the pressureless region and the region under pressure, preferably in the base, in which a pressure-relief valve is located which at a predetermined first pressure level in the region under pressure establishes a fluid-conducting connection from the region under pressure to the pressureless region and at a predetermined second pressure level in the region under pressure interrupts the fluid-conducting connection from the region under pressure to the pressureless region. Hence the pump delivers in the event of excessive pressure in the circuit.

With a view to increasing the achievable pressure level, a second part of the spring arrangement is arranged preferably parallel to the first part of the spring arrangement, which assists the action of the first part of the spring arrangement.

In a first embodiment of the invention the second part of the spring arrangement is a helical spring taking the form of a compression spring which is arranged between the base and the cover.

As an alternative to this, the second part of the spring arrangement may be a helical spring taking the form of a tension spring which is arranged between the base and the wall of the recess.

It is to be understood that the arrangement of the helical spring inside or outside the corrugated bellows as well as its design as a tension spring or compression spring may also be permuted with respect to the alternatives described above.

In both cases the maximal expansion of the reservoir for hydraulic fluid under pressure is limited by a stop member.

The pump is coupled by a transmission to an electric motor which is controlled by the electronic control unit (ECU).

Although the hydraulic control unit described above has been described for a motor-vehicle braking system, to a person skilled in the art it is also readily apparent that the hydraulic control unit according to the invention can also be employed for other purposes. For instance, a subassembly consisting of the cover, the base, the spring-loaded corrugated bellows and/or the helical spring can be inserted into an appropriately shaped recess or bore in a casing, into which yet other components (e.g. valves or such like) may also be integrated but do not have to be.

In this case the casing may be formed as a moulding made of metal or synthetic material. In this connection the space that is formed by the cover, the corrugated bellows and the base may be either the reservoir for the pressurised hydraulic fluid or the space for the pressureless hydraulic fluid. This is dependent on the cabling and on the incoming and outgoing lines.

Further modifications to, additions to and configurations of the present invention will be elucidated on the basis of the following description of the Figures.

Figure 1:
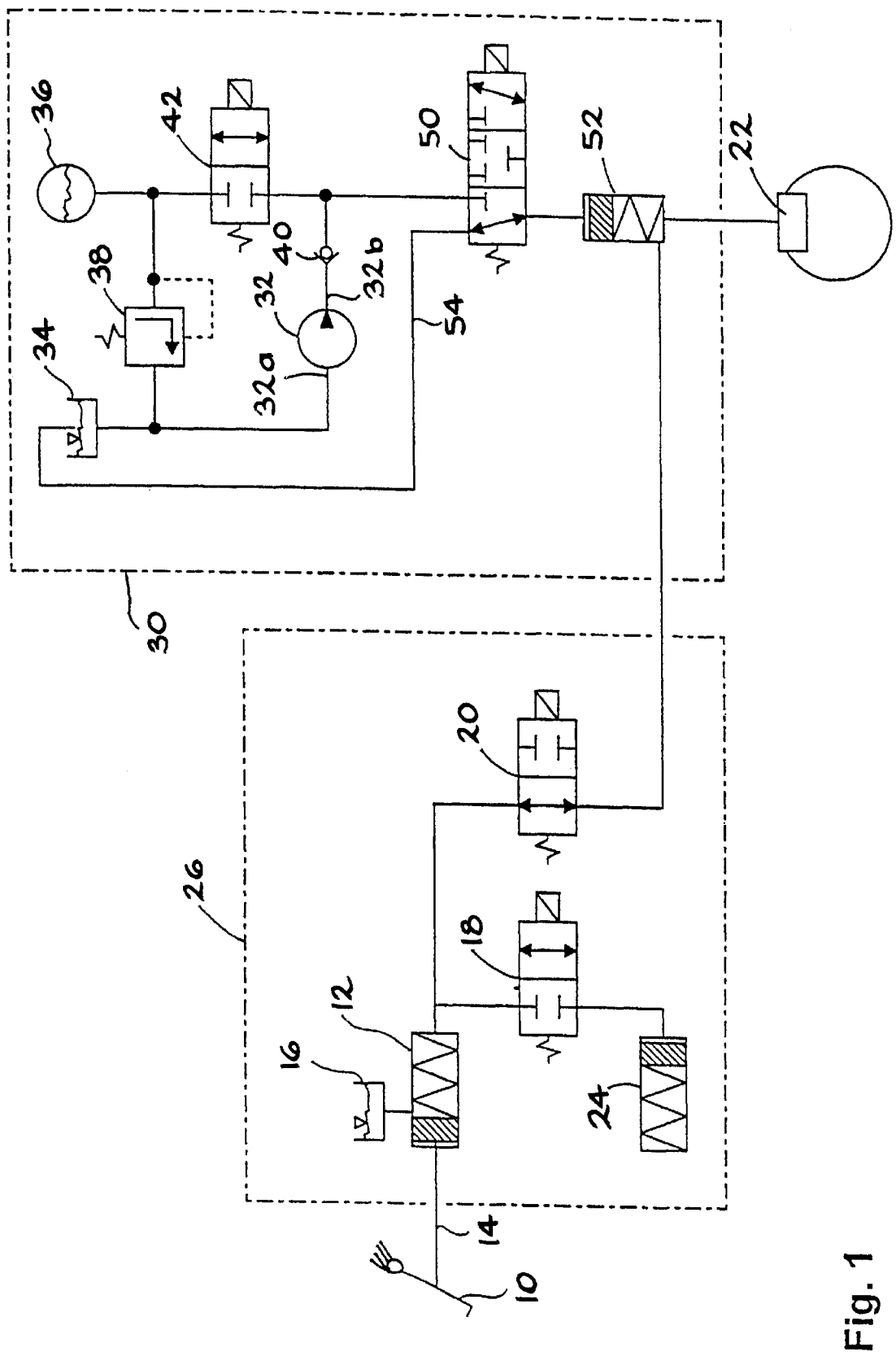
FIG. 1 shows schematically the hydraulic circuit diagram of the relevant part of a motor-vehicle braking system, in which the hydraulic control unit according to the invention is employed.

FIG. 1 shows schematically an electronically controlled hydraulic vehicle braking system. This vehicle braking system comprises a brake pedal 10 which is coupled to a brake master cylinder via an actuating rod 14. The brake master cylinder 12 is connected to a pressureless reservoir 16 for hydraulic fluid. Two electronically controlled valve arrangements 18 and 20 are connected to the output of the brake master cylinder 12. The one valve arrangement 20 establishes in its unactuated initial position a connection to a braking device 22 pertaining to a wheel of the vehicle. In its electronically controlled actuated position this valve arrangement 20 blocks the connection between the brake master cylinder 12 and the braking device 22.

Via the other valve arrangement 18, in the electronically actuated position thereof, the brake master cylinder 12 is connected to a cylinder/piston arrangement 24 for simulating the behaviour of the brake pedal. In the unactuated initial position of the valve arrangement 18 the connection between the brake master cylinder 12 and the cylinder/piston arrangement 24 for simulating the behaviour of the brake pedal is blocked. The actuating and simulating unit 26 described above serves, in particular, for so-called brake-by-wire vehicle braking systems such as are known from DE 43 43 386 A1, for example. However, this arrangement has the disadvantage that the feel of the brake pedal that is offered to the driver and the behaviour of the brake pedal that can be experienced by the driver only correspond inadequately to those known from traditional vehicles. But since for the present invention it is not primarily the actuating and simulating unit 26 that matters, the description of a characteristic-modelling device has been dispensed with in the following.

The hydraulic control unit according to the invention pertaining to the motor-vehicle braking system is the part in FIG. 1 bordered by a dot-and-dash line and provided with the reference symbol 30.

The hydraulic control unit 30 contains a pump 32 delivering hydraulic fluid under pressure, said pump being capable of being controlled by an electronic control unit (not shown) and supplying, in the brake-by-wire operating mode of the motor-vehicle system, hydraulic fluid under pressure for the braking device 22. A first reservoir 34 for pressureless hydraulic fluid is assigned to the pump 32 on its input side 32a, and a second reservoir 36 for hydraulic fluid under pressure is assigned to the pump 32 on its output side 32b. The pump 32, the first and the second reservoirs 34, 36 are arranged in a common casing and form an integrated electrohydraulic modular unit, as will be elucidated in detail further below.

Between the pressureless reservoir 34 and the reservoir 36 for hydraulic fluid under pressure a pressure-controlled pressure-relief valve 38 is arranged in parallel with the pump 32, which at a predetermined first pressure level in the reservoir 36 under pressure establishes a fluid-conducting connection from the reservoir 36 under pressure to the pressureless reservoir 34 and at a predetermined second pressure level in the reservoir 36 under pressure interrupts the fluid-conducting connection from the reservoir 36 under pressure to the pressureless reservoir 34. A check valve 40 is arranged on the output side 32b of the pump 32. On the outlet side of the check valve 40 a valve arrangement 42 which is capable of being actuated electromagnetically is arranged in the connecting line leading to the pressure-relief valve 38 and to the second reservoir 36 for hydraulic fluid under pressure, said valve arrangement being blocked in its unactuated initial position and establishing in its actuated position the connection from the pump 32 to the second reservoir 36.

From the output side of the check valve 40 a connecting line leads to a 3-position control valve 50 with three connections which is likewise capable of being actuated by the electronic control unit (not shown). Depending on the position of the control valve 50, a so-called separating cylinder 52 which is connected in series on the output side of said control valve is pressurised with hydraulic fluid under pressure, or the hydraulic pressure contained in the separating cylinder 52 is maintained or is vented into the pressureless reservoir 34 via a separate line 54. By virtue of the separating cylinder 52 a hydraulic decoupling is obtained between the hydraulic pressure stemming from the hydraulic control unit 30 and the hydraulic pressure of the actuating and simulating unit 26.

For further details on the function of the vehicle braking system that is shown in FIG. 1, reference is made to DE 196 16 538 A1.

Figure 2:
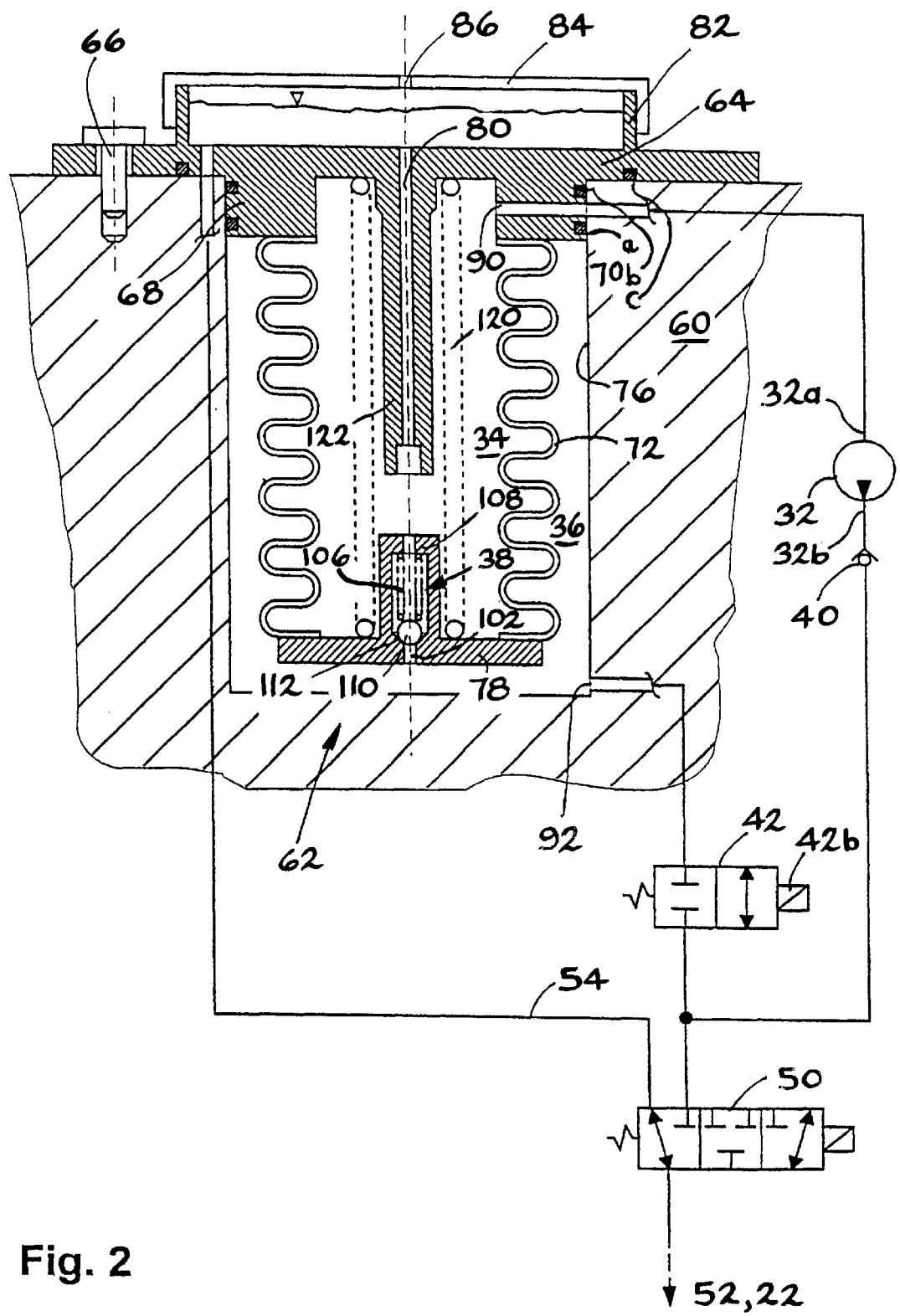
FIG. 2 shows a first configuration of the hydraulic control unit according to the invention in a schematic sectional view.

FIG. 2 shows a first embodiment of the hydraulic control unit according to the invention, in which the pump 32, the first and the second reservoirs 34, 36 are integrated within a common casing as an electrohydraulic modular unit. Visibly formed in a metallic casing block 60 is a recess 62 in the form of a circular cylinder which is sealed in fluid-tight manner by a cover 64. For this purpose the cover 64 exhibits a flange 68 which engages the recess 62 positively. In addition, the cover 64 is screwed to the casing 60 with several screws 66. In addition, several O-ring seals 70a, 70b and 70c are arranged in appropriate grooves in the cover. Welded to the side of the cover facing the recess 62 is a corrugated bellows 72 made of steel which has a smaller diameter than the recess 62, so that between the outside of the corrugated bellows 72 and the cylindrical wall 76 of the recess 62 an outer region is formed which, in the embodiment according to FIG. 2, forms the second reservoir 36 for hydraulic fluid under pressure. A base 78 is welded to the end of the corrugated bellows 72 that is located opposite the cover 64, so that the inner region formed by the cover 64, the corrugated bellows 72 and the base 78 forms the first reservoir 34 for pressureless hydraulic fluid. For this purpose a centrally arranged axial aperture 80 is provided in the cover 64, which extends outwards from the region constituting the first reservoir 34 and therefore connects the first reservoir 34 to an overflow vessel 82 which is moulded onto the outside of the cover. The overflow vessel 82 is formed by an annular ridge 82 which is integrally moulded onto the cover 64 and which is sealed by a cowl 84 in which an aperture 86 leading to the atmosphere is formed.

In the flange 68 of the cover 64 there is arranged a radially extending second aperture 90 extending into the first region constituting the pressureless reservoir 34, which connects the pressureless reservoir 34 to the input side 32a of the pump 32. In the region of the bottom of the recess 62 a third aperture 92 opens extending into the second reservoir 36 containing the hydraulic fluid under pressure, which connects the second reservoir 36 to the output side 32b of the pump 32. Between the third aperture 92 and the output side 32b of the pump 32 there are arranged, in conformity with the hydraulic circuit diagram of FIG. 1, the reversing valve or the valve arrangement 42 and the check valve 40. Said valve arrangement 42 is preferably also integrated into the casing 60 in such a way that, for example, a valve member which is controlled by an electromagnet 42b is capable of being moved back and forth in a bore in the metal block constituting the casing 60.

On the connecting line between the valve arrangement 42 and the check valve 40 there is arranged a branch to the 3/3-way control valve 50 (see also FIG. 1). This control valve 50 is also integrated into the casing 60 so as to form a modular unit in the same way as the valve arrangement 42.

In the base 78 a hydraulic-fluid line 102 is arranged centrally between the pressureless reservoir 34 and the reservoir 36 under pressure. Located in the hydraulic-fluid line 102 is a pressure-relief valve 38 constituted by a helical spring 106 which is supported on an annular flange 108 and presses a spherical valve element 110 against a valve seat 112. In this connection the pressure-relief valve 38 is orientated in such a way that at a predetermined first pressure level in the reservoir 36 under pressure a fluid-conducting connection from the region 36 to the pressureless reservoir 34 is established or is interrupted if this pressure level is exceeded. Acting in parallel with the first part of the spring arrangement in the form of the corrugated bellows 72, a second part of the spring arrangement is provided in the form of a helical spring 120 which assists the action of the corrugated bellows 72. In the embodiment according to FIG. 2 the second part of the spring arrangement is a helical spring 120 taking the form of a compression spring which is clamped between the base 78 and the cover 64.

By virtue of a rod-shaped stop member 122 which is arranged inside the pressureless reservoir 34, coaxial with the helical spring 120 and the corrugated bellows 72, the maximal expansion of the reservoir 36 for hydraulic fluid under pressure is limited. If the stop member 122 strikes the extension of the base 78 in which the pressure-relief valve 38 is located, the maximal expansion of the reservoir 36 under pressure has been reached.

When the reservoir 36 is filled or pressurised with hydraulic fluid, the corrugated bellows is compressed, so that the base 78 moves towards the stop member 122. As a result, the distance by which the corrugated bellows is compressed is proportional to the pressure that has been supplied in the pressure chamber (reservoir 36). By virtue of the proportionality of the pressure prevailing in the pressure chamber to the distance of the base 78, this property can be utilised for the purpose of recording the pressure in the pressure chamber in simple and cost-effective manner by means of a distance sensor, so that a costly pressure sensor which is used conventionally can be eliminated.

Figure 3:
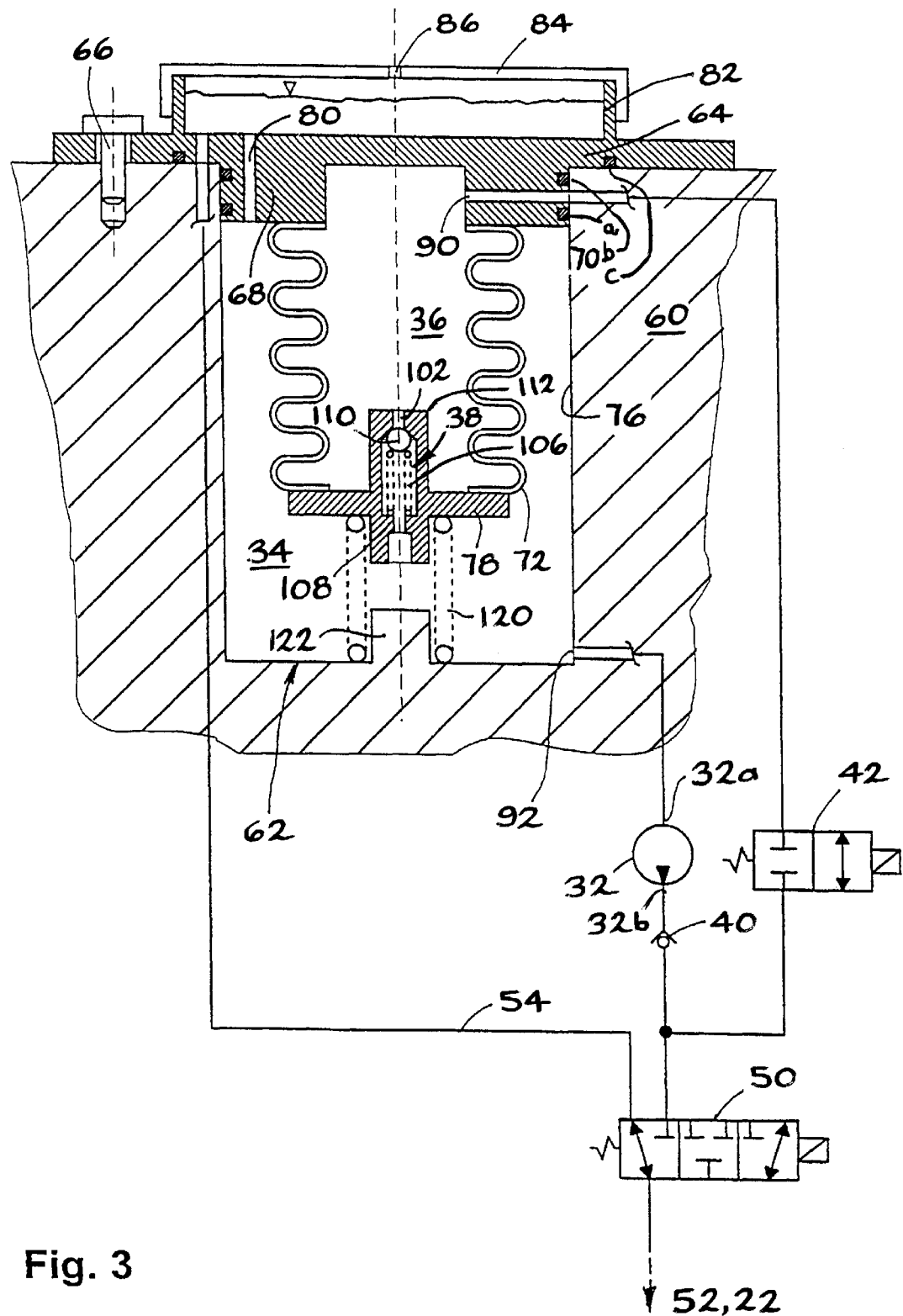
FIG. 3 shows a second configuration of a hydraulic control unit according to the invention in a schematic sectional view.

FIG. 3 shows an alternative embodiment to FIG. 2, in which the pressureless reservoir 34 is located outside the corrugated bellows 72 and the reservoir 36 containing hydraulic fluid under pressure is located inside the corrugated bellows 72. As a result, when the second reservoir 36 is filled or pressurised, the corrugated bellows 72 and the helical spring 120 are not compressed in the longitudinal direction as in FIG. 2 but are expanded. Therefore the pressure-limiting stop 122, the helical spring 120, which may also serve for the purpose of setting the preloading force, as well as the flow direction of the pressure-limiting valve 38 are also changed in comparison with FIG. 2. In other respects the embodiments according to FIG. 2 and FIG. 3 are functionally identical.

In a configuration of the hydraulic control unit such that the actuating and simulating device 26 is also structurally integrated within the same casing block, the reservoir 16 of the actuating and simulating unit 26 may be identical with the reservoir 34 of the hydraulic control unit 30. This brings about an additional saving of space and weight.

The separately manageable assembly constituted by the cover 64, the corrugated bellows 72, and the base 78 (with the pressure-relief valve 38), to which the helical spring 120 may also be assigned in appropriate circumstances, is also suitable for the structure of a hydraulic-accumulator battery in which one or more recesses 62 are provided in a metal block, into which the assembly described above is inserted. A decisive advantage in this case is the minimal space requirement which results by virtue of the fact that the pressureless region situated inside or outside the corrugated bellows, depending on the embodiment, serves as a reservoir for hydraulic fluid. For special applications it may not even be necessary to provide, directly by the two reservoirs 34, 36, the pump 32 in the casing block in which the recesses 62 is formed.

Figure 4:
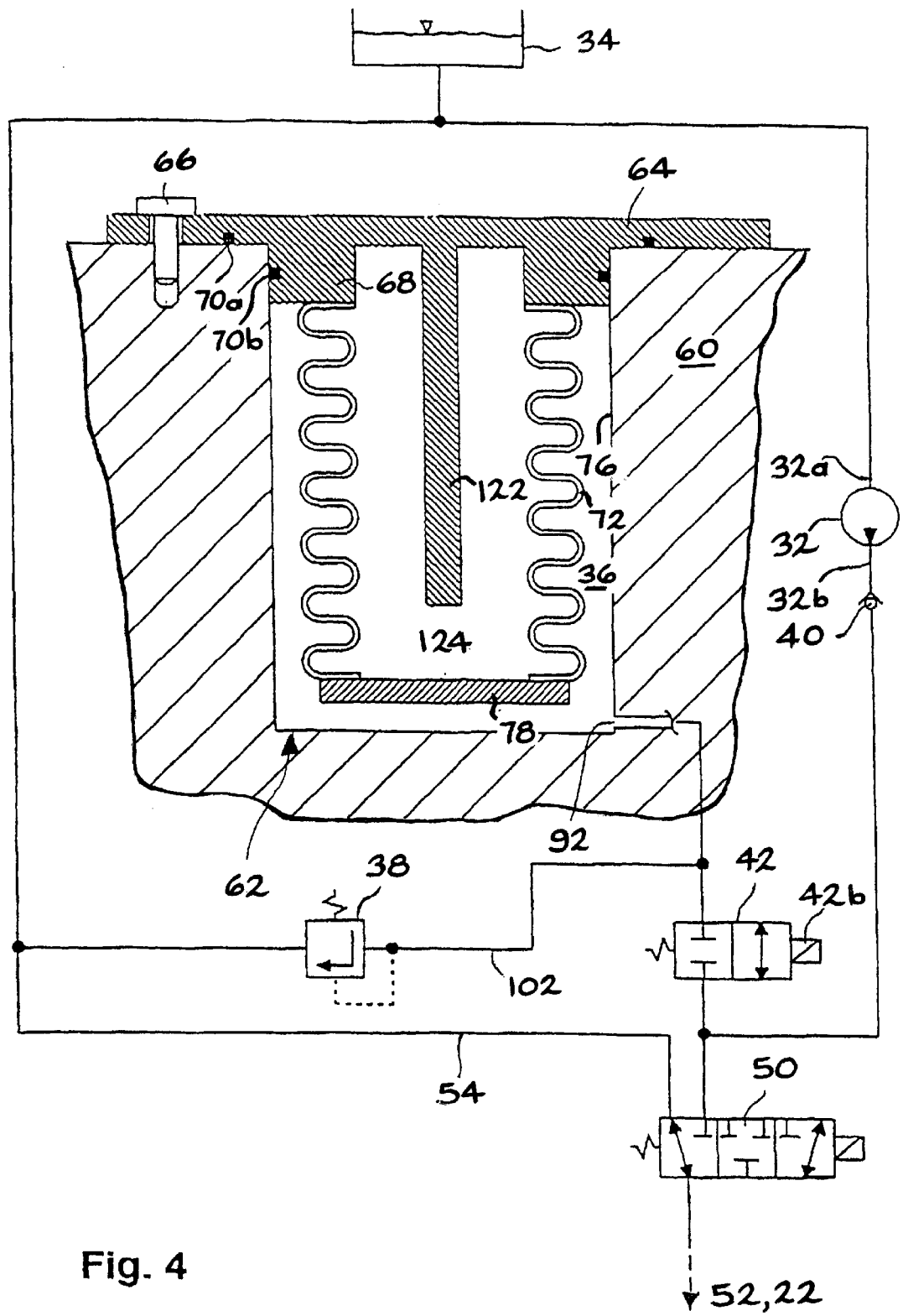
FIG. 4 shows a third configuration of a hydraulic control unit according to the invention in a schematic sectional view.

FIG. 4 shows an alternative embodiment to FIG. 2, in which the pump 32, the first and the second reservoirs 34, 36 are again integrated within a common casing as an electrohydraulic modular unit.

In the metallic casing block 60 the recess 62 is formed which is sealed in fluid-tight manner by the cover 64. For this purpose the cover 64 exhibits the flange 68, in which two O-ring seals 70a and 70b are arranged in appropriate grooves. Welded to the flange 68 is the corrugated bellows 72 subdividing the recess 62 into the outer region, which forms the second reservoir 36, and an inner region 124, which is filled with a gas. The base 78 is welded to the end of the corrugated bellows 72 located opposite the cover 64.

In the region of the bottom of the recess 62 the aperture 92 opens which extends into the second reservoir 36 and connects the latter to the output side 32b of the pump 32. The valve arrangement 42 and the check valve 40 are arranged between the aperture 92 and the output side 32b of the pump 32. The branch to the 3/3-way control valve 50 is arranged on the connecting line between the valve arrangement 42 and the check valve 40 (see also FIG. 2).

The first reservoir 34 is formed in the casing block 60 by means of an overflow vessel. The pressureless reservoir 34 is connected to the input side 32a of the pump 32.

In the hydraulic line 102 between the reservoir 36 or the aperture 92 and the reservoir 34 the pressure-relief valve 38 is arranged at a separate point in the casing block 60.

The gas in the region 124 acts, in the same way as the helical spring 120 in FIG. 2, in parallel with the corrugated bellows 72 and assists the action thereof. The maximal expansion of the reservoir 36 is limited by the rod-shaped stop member 122 inside the region 124.

When the reservoir 36 is filled or pressurised with hydraulic fluid, the corrugated bellows 72 and the gas included within the region 124 are compressed, the distance by which the corrugated bellows 72 is compressed being proportional to the pressure that has been supplied in the reservoir 36.

Figure 5:
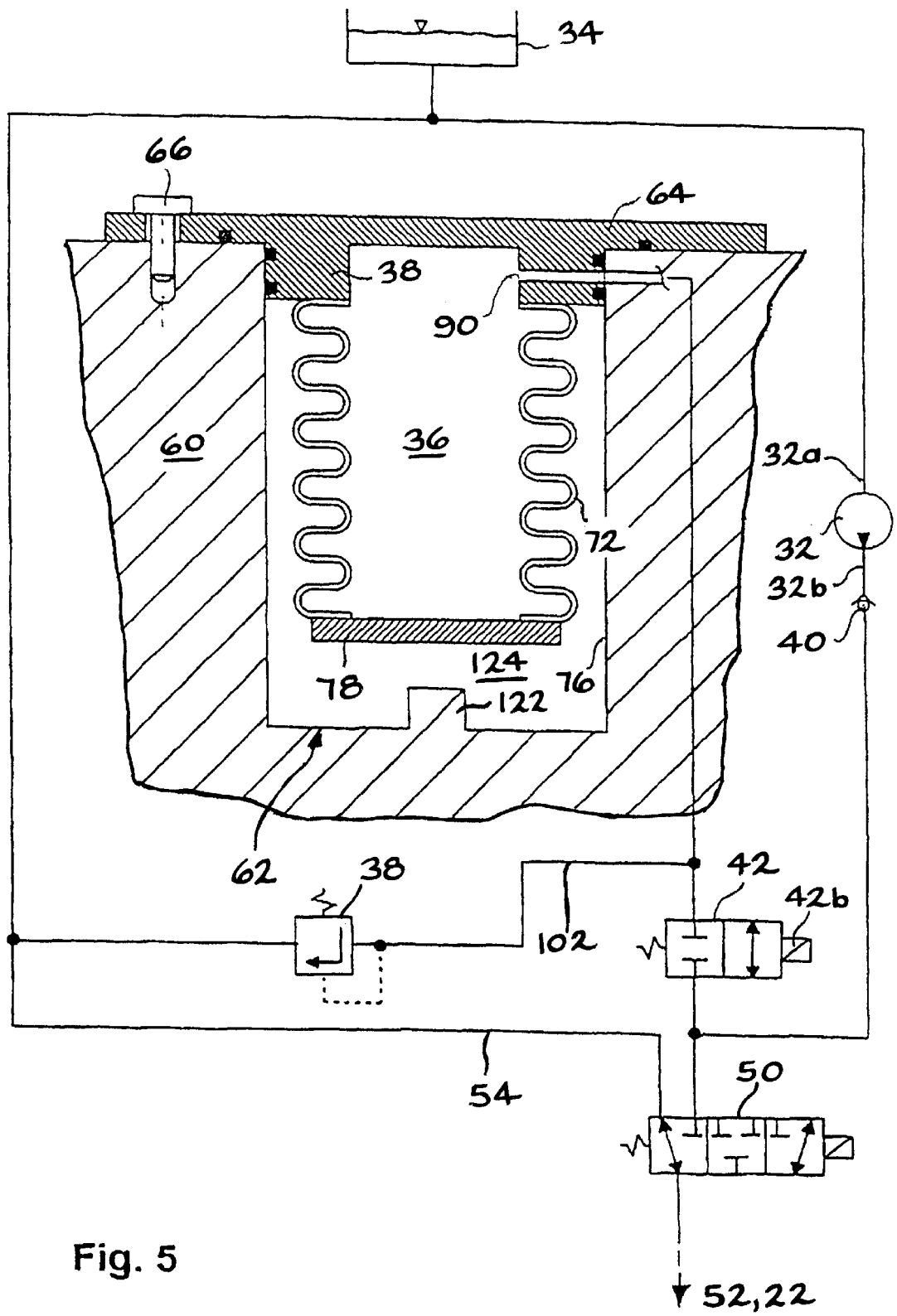
FIG. 5 shows a fourth configuration of a hydraulic control unit according to the invention in a schematic sectional view.

FIG. 5 shows an alternative embodiment to FIG. 3, in which the gas-filled region 124 is located outside the corrugated bellows 72 and the reservoir 36 is located inside the corrugated bellows 72. In this case the pressure-limiting stop 122 is changed in a manner analogous to FIG. 3 and the pressure-limiting valve 38 is changed in a manner analogous to FIG. 4. In other respects the embodiments according to FIG. 4 and FIG. 5 are functionally identical, whereby partial solutions of the embodiments—such as, for example, the arrangement of the reservoir 34 in the region 124—are capable of being combined with one another.

What is claimed is:

1. A hydraulic control unit for a motor-vehicle braking system, with
   a pump delivering hydraulic fluid under pressure, said pump being capable of being controlled by an electronic control unit (ECU) and supplying the hydraulic fluid for at least one braking device which is coupled to a wheel of the vehicle,
   a first reservoir for pressureless hydraulic fluid, which is assigned to the pump on the input side,
   a second reservoir for hydraulic fluid under pressure, which is assigned to the pump on the output side, wherein
   the pump, the first reservoir and the second reservoir are arranged in a common casing integrated as an electrohydraulic modular unit, and
   the second reservoir is a hydraulic pressure accumulator, into which the hydraulic fluid is capable of being conveyed by the pump contrary to the force of a spring arrangement, whereby at least a first part of the spring arrangement is formed by a corrugated bellows.

2. A hydraulic control unit according to claim 1, one wall of the hydraulic pressure accumulator constituting the second reservoir being formed at least partially by a recess in the casing.

3. A hydraulic control unit according to claim 2, the corrugated bellows dividing the recess in the casing into two regions, of which a first region is filled with gas and a second region forms the second reservoir for hydraulic fluid under pressure.

4. A hydraulic control unit according to claim 3, wherein said first region is one of an inner region and an outer region, and said second region is the other of the first region and the outer region.

5. A hydraulic control unit according to claim 2, the corrugated bellows dividing the recess in the casing into two regions, of which a first region forms the first reservoir for pressureless hydraulic fluid and a second region forms the second reservoir for hydraulic fluid under pressure.

6. A hydraulic control unit according to claim 3, wherein said first region is one of an inner region and an outer region, and said second region is the other of the first region and the outer region.

7. A hydraulic control unit according to claim 2, the corrugated bellows being connected at a first end to a cover, which seals the recess in the casing, and being connected at a second end to a base.

8. A hydraulic control unit according to claim 7, a first aperture extending into the first reservoir being arranged in the cover, said first aperture connecting said first reservoir to an overflow vessel.

9. A hydraulic control unit according to claim 8, a second aperture extending into the first reservoir being arranged in the cover, said second aperture connecting said first reservoir to the input side of the pump.

10. A hydraulic control unit according to claim 9, a third aperture extending into the second reservoir being arranged in the wall of the recess, said third aperture connecting said second reservoir to the output side of the pump.

11. A hydraulic control unit according to claim 10, a controllable valve arrangement being arranged between the third aperture extending into the second reservoir and the output side of the pump.

12. A hydraulic control unit according to claim 7, wherein, parallel to the first part of the spring arrangement, a second part of the spring arrangement is arranged which assists the action of the first part of the spring arrangement.

13. A hydraulic control unit according to claim 12, the second part of the spring arrangement being a helical spring taking the form of a compression spring which is arranged between the base and the cover.

14. A hydraulic control unit according to claim 12, the second part of the spring arrangement being a helical spring taking the form of a tension spring which is arranged between the base and the wall of the recess.

15. A hydraulic control unit according to claim 7, an aperture extending into the first reservoir being arranged in the cover, said aperture connecting said first reservoir to the input side of the pump.

16. A hydraulic control unit according to claim 12, an aperture extending into the second reservoir being arranged in the wall of the recess, said aperture connecting said second reservoir to the output side of the pump.

17. A hydraulic control unit according to claim 1, a hydraulic-fluid line being arranged between the pressureless reservoir and the reservoir under pressure, in which a pressure-relief valve is located which at a predetermined first pressure level in the reservoir under pressure establishes a fluid-conducting connection from the reservoir under pressure to the pressureless reservoir and at a predetermined second pressure level in the reservoir under pressure interrupts the fluid-conducting connection from the reservoir under pressure to the pressureless reservoir.

18. A hydraulic control unit according to claim 17, wherein said hydraulic-fluid line arranged between the pressureless reservoir and the reservoir under pressure is formed in the base.

19. A hydraulic control unit according to claim 1, wherein parallel to the first part of the spring arrangement a second part of the spring arrangement is arranged which assists the action of the first part of the spring arrangement.

20. A hydraulic control unit according to claim 1, the maximal expansion of the second reservoir for hydraulic fluid under pressure being limited by a stop member.

21. A hydraulic control unit according to claim 1, the pump being coupled by a transmission to an electric motor which is controlled by the electronic control unit (ECU).

* * * * *